E. H. WEST.
CONTROLLER CLUTCH.
APPLICATION FILED MAR. 1, 1910.
988,234.
Patented Mar. 28, 1911.
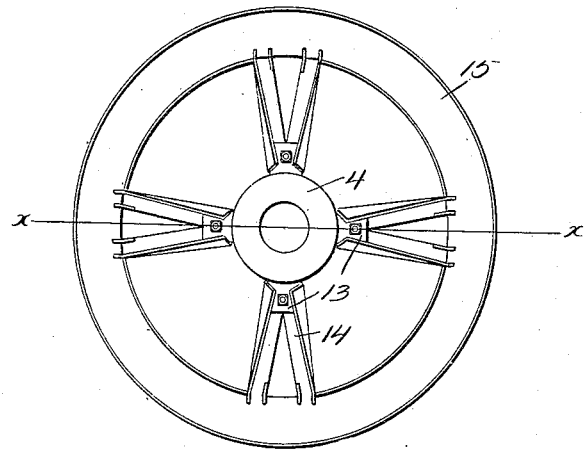
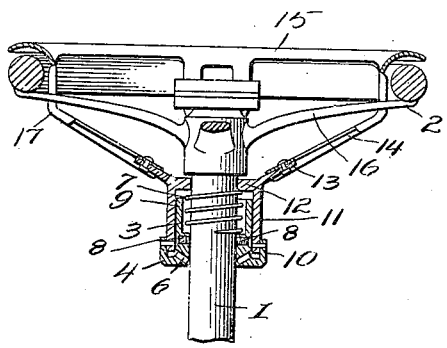
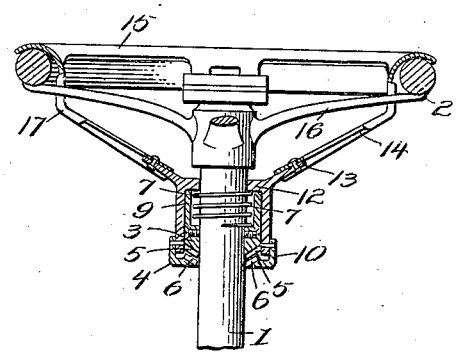
Witnesses
F. C. Gibson
U. B. Hillyard
Inventor
Edward H. West.
By Victor J. Evans
Attorney

UNITED STATES PATENT OFFICE.

EDWARD H. WEST, OF BIRMINGHAM, ALABAMA.

CONTROLLER-CLUTCH.

988,234.     Specification of Letters Patent.     Patented Mar. 28, 1911.

Application filed March 1, 1910. Serial No. 546,679.

*To all whom it may concern:*

Be it known that I, EDWARD H. WEST, a citizen of the United States, residing at Birmingham, in the county of Jefferson and State of Alabama, have invented new and useful Improvements in Controller-Clutches, of which the following is a specification.

In the operation of vehicles and conveyances equipped with steering mechanism adapted to be operated by means of a hand wheel it is desirable at times, particularly on straight stretches, to secure the hand or steering wheel against possible movement, thereby enabling the operator to relax the grip upon said steering wheel with the result that greater ease and comfort in the operation of mechanically propelled machines are attained.

The purpose of the present invention is the provision of a lock or clutch whereby the controller wheel of steering mechanism may be made secure when released from the grip or pressure of the hand, thereby preventing any movement of the steering mechanism from the fixed or set position.

A further purpose of the invention is to combine with the clutch or lock means whereby force exerted through the hands either by the weight, pressure or grip thereof effects release of the clutch or lock, so that the steering mechanism may be operated in the usual manner.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a top plan view of a steering wheel embodying the invention. Fig. 2 is a section on the line $x$—$x$ of Fig. 1, showing the relation of the parts when the lock or clutch is released. Fig. 3 is a view similar to Fig. 2, showing the clutch in locked position.

Corresponding and like parts are referred to in the following description, and indicated in all the views of the drawing, by the same reference characters.

The numeral 1 designates the fixed post of a steering mechanism such as applied to mechanically propelled machines of the automobile type and 2 indicates the hand or steering wheel which is movable with reference to the fixed steering post 1 and secured to the movable steering post to turn therewith. These parts may be of any construction and arrangement such as commonly applied to the various makes and types of machines. In accordance with this invention a clutch or lock is provided and coöperates with the parts 1 and 2 so as to secure the same when the steering wheel is relieved of the influence of the hand of the operator, thereby holding the steering mechanism in the required position. The clutch or lock comprises essentially two members 3 and 4. The member 3 is secured to the fixed steering post 1 and is provided with clutch teeth 5. The member 4 is connected with the steering wheel 2 and is provided with corresponding clutch teeth 6. When the steering wheel 2 is under the influence of the operator either by being gripped or by the hand resting thereon the clutch teeth 5 and 6 of the clutch or lock members are disengaged, thereby admitting of the steering mechanism being moved freely to direct the machine in its travel in the manner well understood. When the steering wheel 2 is relieved of the direct influence of the operator the clutch teeth 5 and 6 are brought into engagement, thereby locking the steering wheel to the fixed steering post and preventing any movement of the steering mechanism from the set position. A spring 7 coöperates with the clutch members to bring them into engagement, but the tension of the spring 7 is such as to admit of the same being overcome by a light force, as by the hand gripping the steering wheel or resting lightly thereon.

The member 3 may be secured to the steering post 1 in any manner, as by means of set screws 8, and embodies a sleeve 9, which is spaced from the steering post and encircles the spring 7 so as to protect the same from injury. The member 4 is provided with a flange 10 and encircles the steering post 1 below the member 3 and is adapted to turn freely thereon. A sleeve 11 encircles the sleeve 9 and is adapted to turn freely thereon and is secured at its lower end to the flange 10 of the member 4. An inner flange 12 is formed at the upper end of the sleeve 11 and overhangs the spring 7 and sleeve 9 and encircles the upper portion of the steering post 1 at a point below the hub of the steering wheel 2. A series of lugs 13 project outwardly from the sleeve 11 and have the spokes 14 of the hand piece fastened thereto in any manner. The spokes 14 of the hand piece 15 are adapted to engage the spokes 16 of the steering wheel, so that when the member 4 is locked to the member 3 the steering wheel 2 will be prevented from casual movement in either direction. The outer upper ends of the spokes 14 are formed with slots 17 through which the outer ends of the spokes 16 pass, thereby admitting of the hand piece 15 having a limited vertical movement essential to admit of engagement or disengagement of the clutch teeth 5 and 6. The hand piece 15 is of annular form and is arranged in close proximity to the rim of the steering wheel 2, so as to be conveniently engaged by the hand when the operator has the steering wheel under control, either by gripping the same or resting the hand thereon. For convenience the hand piece 15 is arranged above the rim of the steering wheel so as to receive the direct pressure of the hand when exerted to move or control the steering wheel. For convenience the hand piece 15 and spokes 14 are of integral formation, being struck from a sheet metal blank, the hand piece being of concavo-convex form in cross section so as to conform approximately to the circular or convex outline of the upper portion of the steering wheel.

A steering wheel and fixed steering post equipped with the invention insures a locking of the steering wheel when the latter is relieved of the influence of the hand, the spring 7 coming into play and moving the clutch member 4 upward so as to bring the clutch teeth 6 thereof into engagement with the clutch teeth 5 of the member 3. This is of advantage when the steering mechanism is set for a straight stretch, thereby enabling both hands of the operator to be free and momentarily relaxed. Upon applying force to the steering wheel either by gripping the same or by placing the hand thereon the hand piece is depressed, thereby moving the clutch member 4 away from the clutch member 3 and releasing the steering wheel, which is free to be operated in the usual manner.

Having thus described the invention what is claimed as new, is:—

1. In combination with the hand wheel of steering mechanism, a fixed lock member having a sleeve, a helical spring located within said sleeve, a movable lock member arranged to engage the first mentioned lock member and having a sleeve encircling the aforesaid sleeve and provided with an inwardly extending portion to receive the end thrust of said helical spring, and a hand piece carried by the hand wheel and movable therewith and connected with the movable lock member.

2. In combination with the hand wheel of steering mechanism, a circular hand piece rotatable with the hand wheel and movable toward and from the plane thereof, a fixed lock member of circular form, a second lock member having connection with the hand piece and comprising a sleeve and an inwardly extending flange, and a helical spring inclosed by the sleeve of the movable lock member and confined between the flange thereof and the said fixed lock member.

3. In combination with the hand wheel of steering mechanism comprising a rim and spokes, a circular hand piece, spokes connected with said hand piece and extending across the path of the spokes of the hand wheel to engage therewith, a fixed lock member, a movable lock member, a spring normally pressing the two lock members into locked engagement, and connecting means between the spokes of the hand piece and the movable lock member.

In testimony whereof I affix my signature in presence of two witnesses.

EDWARD H. WEST.

Witnesses:
 IVA VELTMAN,
 JOHN F. WILLIAMS.